(12) United States Patent
Sun et al.

(10) Patent No.: US 11,782,629 B2
(45) Date of Patent: Oct. 10, 2023

(54) DATA PROCESSING METHOD, DEVICE, AND ELECTRONIC DEVICE

(71) Applicant: Lenovo (Beijing) Limited, Beijing (CN)

(72) Inventors: Xianwu Sun, Beijing (CN); Quan Wang, Beijing (CN); Shengyu Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/474,620

(22) Filed: Sep. 14, 2021

(65) Prior Publication Data

US 2022/0129160 A1 Apr. 28, 2022

(30) Foreign Application Priority Data

Oct. 28, 2020 (CN) .......................... 202011175058.1

(51) Int. Cl.
*G06F 3/06* (2006.01)
*G06F 11/10* (2006.01)
*G06F 11/14* (2006.01)

(52) U.S. Cl.
CPC ............ *G06F 3/065* (2013.01); *G06F 3/0619* (2013.01); *G06F 3/0652* (2013.01); *G06F 3/0659* (2013.01); *G06F 3/0673* (2013.01); *G06F 11/1044* (2013.01); *G06F 11/1448* (2013.01); *G06F 11/1458* (2013.01); *G06F 11/1469* (2013.01)

(58) Field of Classification Search
CPC ...... G06F 3/065; G06F 3/0619; G06F 3/0652; G06F 3/0659; G06F 3/0673; G06F 3/0613; G06F 3/064; G06F 11/1044; G06F 11/1469; G06F 11/1448; G06F 11/1458; G06F 16/901
See application file for complete search history.

(56) References Cited

U.S. PATENT DOCUMENTS

| 2014/0325260 A1* | 10/2014 | Gladwin | G06F 11/1092 714/6.13 |
| 2015/0052176 A1* | 2/2015 | Akaike | G06F 16/13 707/812 |
| 2017/0123708 A1* | 5/2017 | Kandiraju | G06F 3/0688 |
| 2021/0097043 A1* | 4/2021 | Xiao | G06F 16/27 |

* cited by examiner

Primary Examiner — Masud K Khan
(74) Attorney, Agent, or Firm — ANOVA LAW GROUP, PLLC

(57) ABSTRACT

A data processing method includes in response to determining that data corresponding to received data to be written exists, determining a first data identifier of the data corresponding to the data to be written, where the first data identifier is used to obtain a first storage area corresponding to the data, generating a second data identifier of the data to be written, writing the data to be written into the second storage area, in response to receiving a data rollback instruction, obtaining a target data identifier corresponding to the data rollback instruction, and determining a target storage area based on the target data identifier to obtain rollback data from the target storage area. The second data identifier is different from the first data identifier, and the second data identifier corresponds to a second storage area different from the first storage area.

17 Claims, 6 Drawing Sheets

DATA PROCESSING METHOD, DEVICE, AND ELECTRONIC DEVICE

CROSS-REFERENCE TO RELATED APPLICATION

This application claims priority to Chinese Patent Application No. 202011175058.1, filed Oct. 28, 2020, the entire content of which is incorporated herein by reference.

TECHNICAL FIELD

The present disclosure relates to the field of electronic technology and, in particular, to a data processing method, device, and an electronic device.

BACKGROUND

With a widespread application of software-defined storage, a plurality of interfaces are provided to an outside world, business application support is very extensive, and an amount of data stored in the system is getting larger and larger. Based on a commonly used copy mechanism, a pressure of the cost also increases exponentially with increasing of the amount of data. Therefore, more and more users adopt erasure coding (EC) as a data redundancy method. Based on the erasure coding technology, original data needs to be backed up to modify the writing and jump to a corresponding data state when needed.

For systems that support erasure coding based on file systems, an only way to modify a writing data backup is to copy the data and then write new data. In this way, modifying the writing with erasure coding causes a serious write amplification phenomenon, thereby resulting in low modification of writing performance.

SUMMARY

In accordance with the disclosure, there is provided a data processing method including in response to determining that data corresponding to received data to be written exists, determining a first data identifier of the data corresponding to the data to be written, where the first data identifier is used to obtain a first storage area corresponding to the data, generating a second data identifier of the data to be written, writing the data to be written into the second storage area, in response to receiving a data rollback instruction, obtaining a target data identifier corresponding to the data rollback instruction, and determining a target storage area based on the target data identifier to obtain rollback data from the target storage area. The second data identifier is different from the first data identifier, and the second data identifier corresponds to a second storage area different from the first storage area.

Also in accordance with the disclosure, there is provided a data processing device including a first determining unit used to in response to determining that data corresponding to received data to be written exists, determine a first data identifier of the data corresponding to the data to be written, where the first data identifier is used to obtain a first storage area corresponding to the data, a generating unit used to generate a second data identifier of the data to be written, a writing unit used to write the data to be written into the second storage area, an obtaining unit used to obtain a target data identifier corresponding to a data rollback instruction in response to receiving the data rollback instruction, and a second determining unit used to determine a target storage area based on the target data identifier to obtain rollback data from the target storage area. The second data identifier is different from the first data identifier, and the second data identifier corresponds to a second storage area different from the first storage area.

Also in accordance with the disclosure, there is provided an electronic device including a memory storing a computer program, and a processor configured to execute the computer program to determine a first data identifier of first data corresponding to received data to be written to obtain a first storage area corresponding to the first data based on the first data identifier, generate a second data identifier of the data to be written, write the data to be written into the second storage area, in response to receiving a data rollback instruction, obtain a target data identifier corresponding to the data rollback instruction, and determine a target storage area based on the target data identifier to obtain rollback data from the target storage area. The second data identifier is different from the first data identifier, and the second data identifier corresponds to a second storage area different from the first storage area.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

A data processing method consistent with the embodiments of the present disclosure is provided, which is applied in the field of erasure coding. Faced with an increasing amount of data, more and more users begin to adopt erasure coding as a way of data redundancy. To ensure that a modification of writing can be rolled back to a state consistent with a last state when needed, it needs to back up original data. For systems with file-based erasure coding support, the only way to modify write data backup is to copy the data and then write new data, which causes a serious write amplification phenomenon, thereby resulting in low modification of writing performance makes the write amplification phenomenon very serious when the erasure coding is modified and writes. To solve the above problems, in the present disclosure, the metadata storage structure of the kernel-mode file system is extended to realize that data corresponding to a same location supports multiple data identifiers and realize that overwritten data is distinguished by the data identifiers. Therefore, an inefficient backup method through reading and writing is no longer needed to support rollback, and the data can be rollback to data corresponding to any version without additional reading and writing. Erasure coding (EC) is a data protection method that divides data into segments, expands and encodes redundant data blocks, and stores them in different locations, such as a disk, a storage node, or another geographic location.

Figure 1:
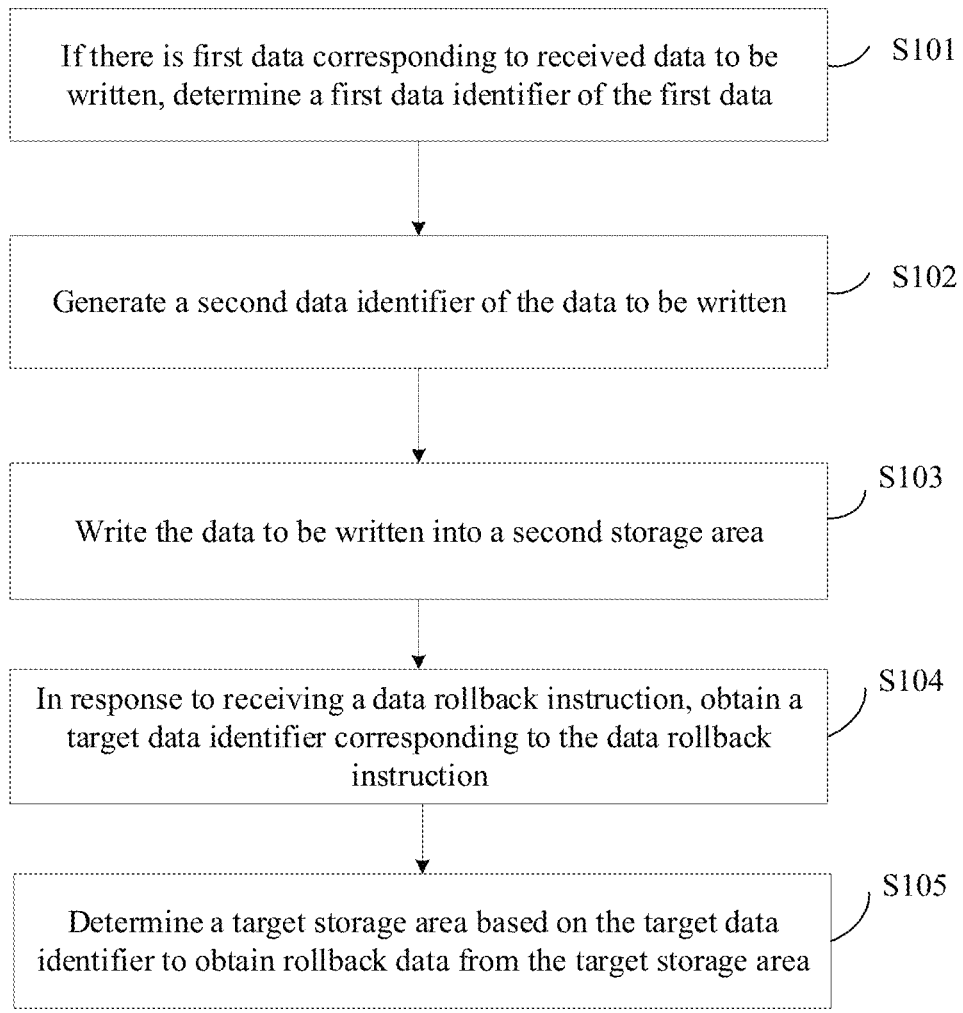
FIG. 1 is a schematic flow chart of a data processing method consistent with the embodiments of the disclosure.

FIG. 1 is a schematic flow chart of a data processing method consistent with the embodiments of the disclosure. As shown in FIG. 1, the method includes the following processes.

At S101, if there is first data corresponding to received data to be written, a first data identifier of the first data is determined.

The data to be written is data that needs to be written into a storage. There are different areas in the storage, that is, corresponding to different storage areas. Each storage area may already have data stored in it, or may be an idle storage area. The data stored in different storage areas are related. For example, the data of two adjacent storage areas may represent data generated in adjacent time periods after the data is composed. Data of a same type or a same attribute may be allocated in a specific storage area.

First data corresponding to the data to be written is data with the same attribute as the data to be written, for example, they are all collected data for a target device in a target state, but may be collected at different collection times and different collection versions. Data corresponding to each data identifier is stored in a corresponding storage area. The storage areas of data with the same attributes can belong to a same storage area set. Therefore, the first storage area corresponding to the first data can be obtained through the first data identifier. The first data identifier may include globally unique information, for example, a version number of the data.

At S102, a second data identifier of the data to be written is generated.

At S103, the data to be written is written into a second storage area.

After the first data identifier of the first data is determined, the second data identifier of the data to be written is generated according to the first data identifier, that is, the second data identifier is different from the first data identifier. The second data identifier corresponds to the second storage area, the second storage area is therefore different from the first storage area.

Therefore, the second storage area corresponding to the second data identifier is allocated, and the data to be written is written into the second storage area.

In the embodiments of the present disclosure, the data to be written is distinguished by adding the data identifiers. Different data identifiers correspond to different storage areas, and storage areas between associated data may belong to the same data storage set. When the data identifier includes the version information of the data, the data corresponding to the same data storage set supports multiple versions is therefore realized, thereby realizing that overwritten data has version management.

At S104, in response to receiving a data rollback instruction, a target data identifier corresponding to the data rollback instruction is obtained.

At S105, a target storage area is determined based on the target data identifier to obtain rollback data from the target storage area.

Data rollback refers to restoring the data to a previous correct state when the data is processed incorrectly. In the embodiments of the present disclosure, the data rollback instruction refers to a data recovery instruction. Because data in a same location (that is, the same data storage set) has identification information, when the data rollback instruction is received, the data can be restored to a data state of the corresponding identifier, and the obtained rollback data is the data of the data state. Specifically, the corresponding target data identifier is obtained according to the data rollback instruction. The target storage area can be determined based on the data identifier, and the rollback data, that is, the data that needs to be restored to the corresponding version, is obtained through the target storage area.

Therefore, in the embodiments of the present disclosure, it is no longer needed to roll back through the low-efficiency backup method of reading and writing, and it is realized that the data corresponding to any data identifier can be rolled back without adding additional reading and writing.

To facilitate the use of the data identifier of the stored data, in the embodiments of the present disclosure, an index of the stored data of the storage area may be generated. The index represents a mapping relationship between location information of the stored data of the storage area and the data identifier. That is, the location information of the stored data is in one-to-one correspondence with the data identifier. For example, the first storage area corresponds to the first data identifier of the first data, and the second storage area corresponds to the second data identifier of the second data. That is, the corresponding data storage area can be found according to the data identifier. To facilitate calling of the index, the index is stored in an index storage area. That is, by storing the index through a specific area, it is convenient to use and update the index without affecting calling and processing of other data.

Determining the target storage area based on the target identifier includes calling the index of the index storage area and obtaining the target storage area corresponding to the target data identifier based on the index, and obtaining the rollback data of the target storage area. The storage area corresponding to the data identifier can be searched for through the index.

In the embodiments of the present disclosure, a writing process of the data to be written refers to a data overwriting process if there is data of the previous version corresponding to the data to be written. If there is no data of the previous version that corresponds to the data to be written, the writing process of the data to be written is equivalent to a writing process of ordinary data, that is, writing the data to be written to the corresponding storage area, that is, a free storage area.

Figure 2:
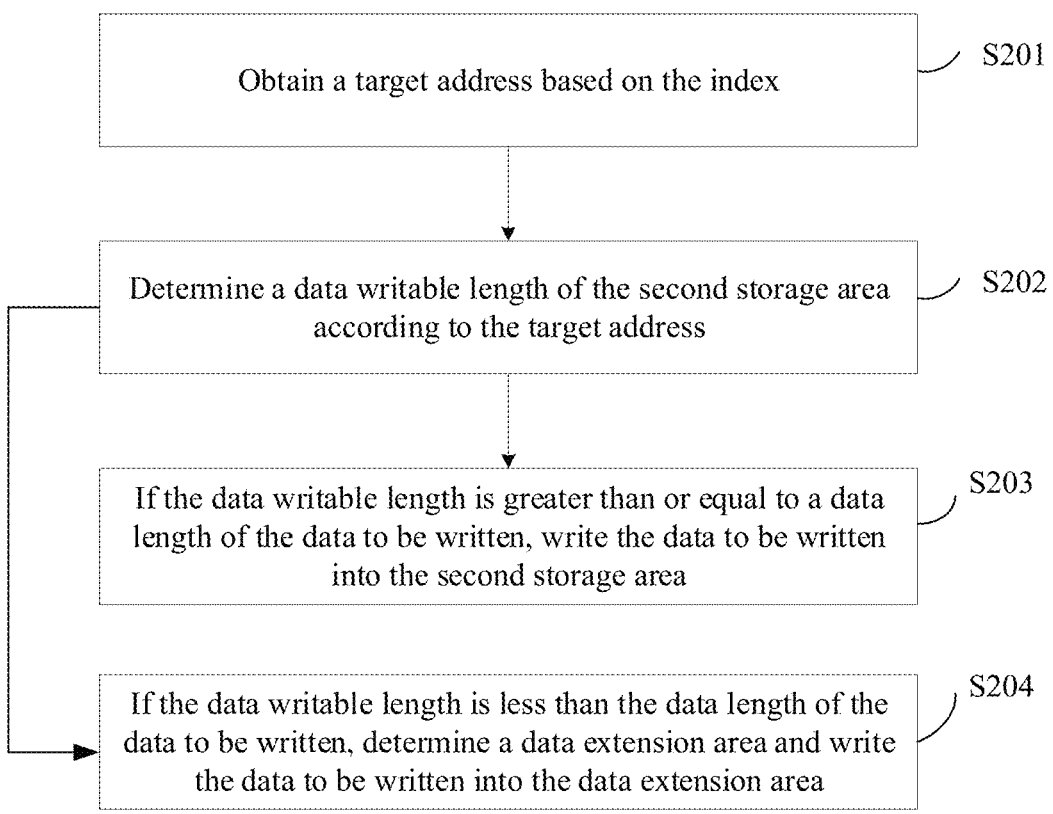
FIG. 2 is a schematic flow chart of a method for writing data to be written consistent with the embodiments of the disclosure.

FIG. 2 is a schematic flow chart of a method for writing data to be written consistent with the embodiments of the disclosure. As shown in FIG. 2, the method includes the following processes.

At S201, an address, in the second storage area, to which the data is to be written is obtained based on the index. The address to which the data is to be written is also referred to as an "address for writing" or a "target address."

At S202, a data writable length of the second storage area is determined according to the target address.

At S203, if the data writable length is greater than or equal to a data length of the data to be written, the data to be written is written into the second storage area.

At S204, if the data writable data length is less than the data length of the data to be written, a data extension area is determined, and the data to be written is written into a data extension area.

Because the index records the mapping relationship between the location information of the stored data and the data identifier, an actual writing area can be determined based on the index and the data length of the data to be written. Specifically, the actual writing area can be determined according to a current writing offset and length, and the data length, which will be described in detail in the subsequent embodiments and will not be repeated here.

Because the location of the stored data is recorded in the index, when the data to be written is written into the corresponding data extension area, the index is updated based on the writing address of the data extension area corresponding to the data to be written and the second data identifier of the data to be written, to realize that accurate location information of the data can be obtained after searching the data using the index.

On the basis of the above embodiments, obtaining the rollback data through the target storage area includes determining whether the data extension area is included based on the location information of the stored data corresponding to the target data identifier; if not, the target data is obtained from the target storage area; if yes, the target data is obtained from the data extension area.

In an example embodiment, the target data can be obtained based on the accurate location information of the stored data, to cause the data to be rolled back to an accurate state.

When the data rollback instruction includes an erasure coding rollback request, the method further includes in response to completing the data rollback of the rollback data, adding rollback status information to the data identifier corresponding to the rollback data. The rollback status information may include a rollback time, rollback version information, etc. It is convenient to obtain detailed information of the data.

In the embodiments of the present disclosure, if the target storage area stores data with a plurality of different data identifiers, it is detected whether any data meets a deletion condition, if so, the data that meets the deletion condition is deleted from the target storage area, and the index of the index storage area is updated according to the data after deletion.

The deletion condition can be determined according to an actual application scenario, for example, according to the status information of the data, the writing time of the data, etc. For example, when the data is completely placed on a disk, the data is deleted from the corresponding storage area, that is, the target storage area, to release a capacity of the storage area. The index is updated according to the data after deletion, to enable the index to correspond to the actual state of the data in real time.

The above data processing method will be described below with the data identifier being the data version. The writing operation of the erasure coding can be distinguished by the following manners.

One possible implementation manner is to add POSIX (portable operating system interface) to distinguish the writing operation of the erasure coding. POSIX standard defines an interface standard that an operating system provides for the application. An execution function can be defined as "ssize_t ecwrite (int fd, uint64_t tid, const void * buf, size_t count)" with the following information.

fd: a file handle;

tid: a current writing operation transaction number, for example, a version number, which is globally unique;

buf: current writing data content;

count: a current writing data length.

Another possible implementation manner is to extend the writev (which characterizes an interface that stores multiple pieces of data together and writes data residing in two or more unconnected buffers at once) provided by POSIX to distinguish the writing operation of the erasure coding. The execution function can be defined as "Ssize_t writev(int fd, iovec iov, size_t count)" with the following information:

fd: the file handle;

iov: a buffer array, user data;

count: a count number of the data.

By using a last requisition of an iov array as a type distinction definition, a space occupied by this part is removed when data is written to achieve a special meaning, for example, identification information of the array.

For example:

```
Struct ecinfo {
    Uint64_t tid; //Current writing transaction
    Int magic; //Magic number, check code
}.
```

The embodiments of the present disclosure also include an extension of a metadata structure, where the metadata is a description of the data. A metadata index node (inode) extends 4 bytes to store the corresponding identification information (nat page id), where the data storage area (page) stores ec node page (erasure coding node storage area) information in a form of a doubly linked list. The page records a modification of writing content as follows:

```
Struct tidinfo {
    Uint64 tid; //Modify writing transaction
    Int offset; // Corresponding file offset of the
        modification of writing
    Int length; // Length of corresponding data block
        of the modification of writing
    Int nid;//nid extension block address, page stores
        more than 32 block addresses
    struct f2fs_blkaddr addr[32] //Inline block address
}.
```

Figure 3:
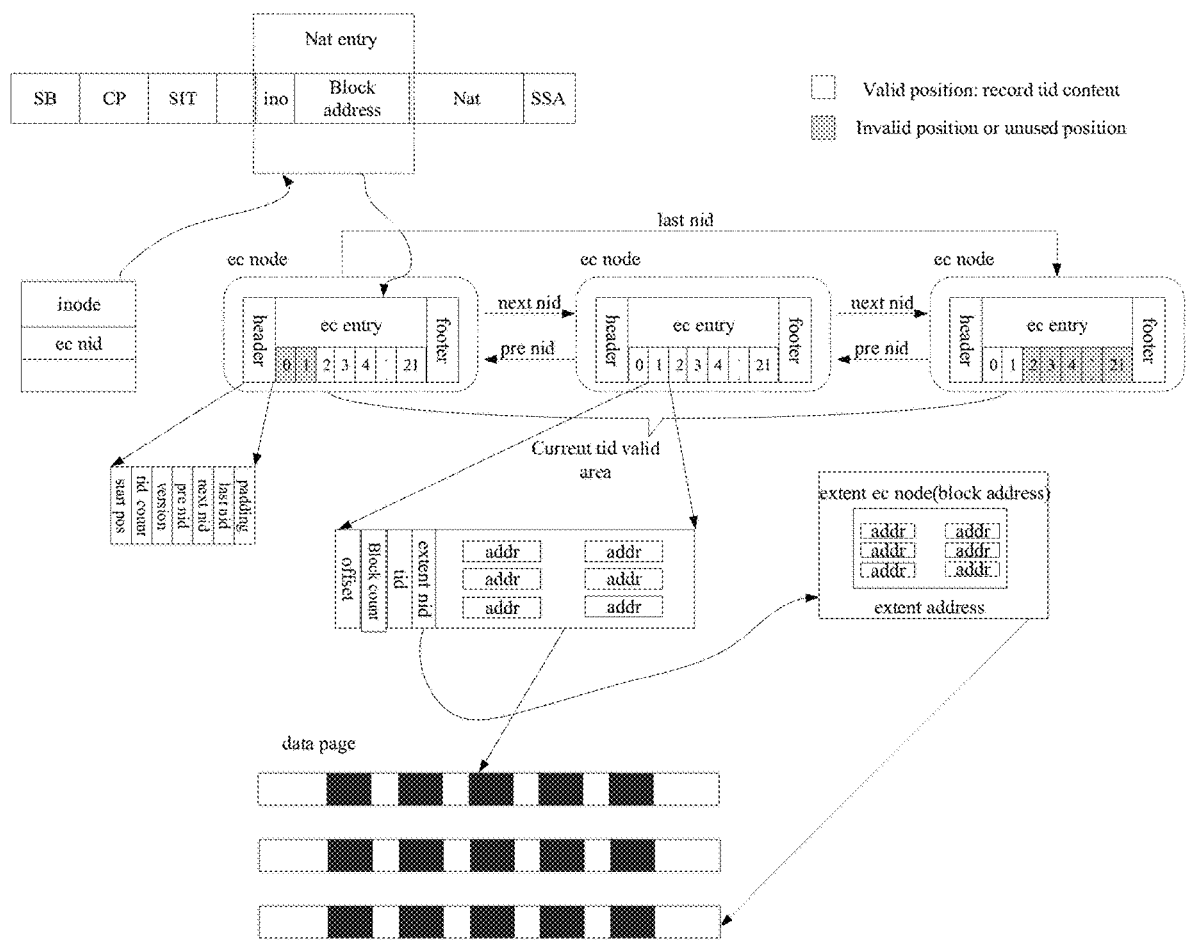
FIG. 3 is a schematic diagram of an overall structure and principle of metadata consistent with the embodiments of the disclosure.

FIG. 3 is a schematic diagram of an overall structure and principle of metadata consistent with the embodiments of the disclosure. As shown in FIG. 3, the metadata is described for a NAT (node address table) structure. Another structure may also be used for the metadata, the overall structure and principle of the metadata are similar to those of the NAT structure, which are omitted here. NAT is a structure used by F2FS (flash-friendly file system) to manage nodes, which records that each node is assigned a node ID (nid). The system can find a physical address of the node at the flash device from the NAT according to the nid, and then read the node from the flash device.

The F2FS usually divides an entire volume into the following areas: SB (super block), which has basic partition information and F2FS default parameters, are generated during formatting, and cannot be changed; CB (checkpoint), which saves a file system state; SIT (segment information table), which contains segment information, such as a count number of valid blocks and all valid bitmaps in a main area; NAT, which is a block address table to find all "node blocks" stored in the main area; SSA (segment summary area), which stores a summary entry representing owner information of all blocks in the main area. To facilitate the overwriting of the erasure coding, the areas also include a node block entry area (Nat entry), which includes an ino (inode) through which relevant information of index list can be obtained, and a block address indicating the location information of the data block.

The index list includes inode, which is used to store index information, i.e., ec nid (erasure coding block address identifier). The corresponding version information and the writing location information of the erasure coding data can be obtained through the index list when the erasure coding data is written.

In a middle part of FIG. 3, the structure of an erasure coding node (ec node) is shown, which includes a header, a footer, and an erasure coding entry area (ec entry). The ec entry includes a valid position and an invalid position (or unused area). The valid position is used to record the writing operation transaction number (tid), which can be a version number and a globally unique identifier. The invalid position refers that the recorded information is invalid. The unused area may be an area where nothing is written. The information that can be recorded in the valid position includes address information (address), an extension block address identifier (extent nid), the writing operation transaction number (tid), block count information (block count), and compensation information (offset). Correspondingly, content of the header and the footer can be customized according to actual application requirements. For example, the header may include padding, a last block address identifier (last nid), a next block address identifier (next nid), a previous block address identifier (pre nid), version information (version), a writing transaction count (tid count), and start position information (start pos). Specifically, the next ec node can be accessed through the next block address identifier, and the previous ec node can be accessed through the previous block address identifier.

When the writing of the erasure coding is performed, if the writable data length of the current data area is less than the length of the data to be written, the corresponding extension erasure coding node (extent ec node) can be obtained through the extension block address identifier to obtain the data writable extension area. Then the data is written into the corresponding data page through the block address of the valid area, or the data is written into the corresponding data page through the extension erasure coding writing address.

In the embodiments of the present disclosure, through the extension of the metadata structure shown in FIG. 3, it is realized that the data corresponding to the same position supports multiple versions, that is, the different tids corresponding to the different valid areas in FIG. 3 can be different versions, thereby realizing the management by the versions of the data blocks of the overwriting of the erasure coding, and the rollback to any version without adding additional reading and writing.

Figure 4:
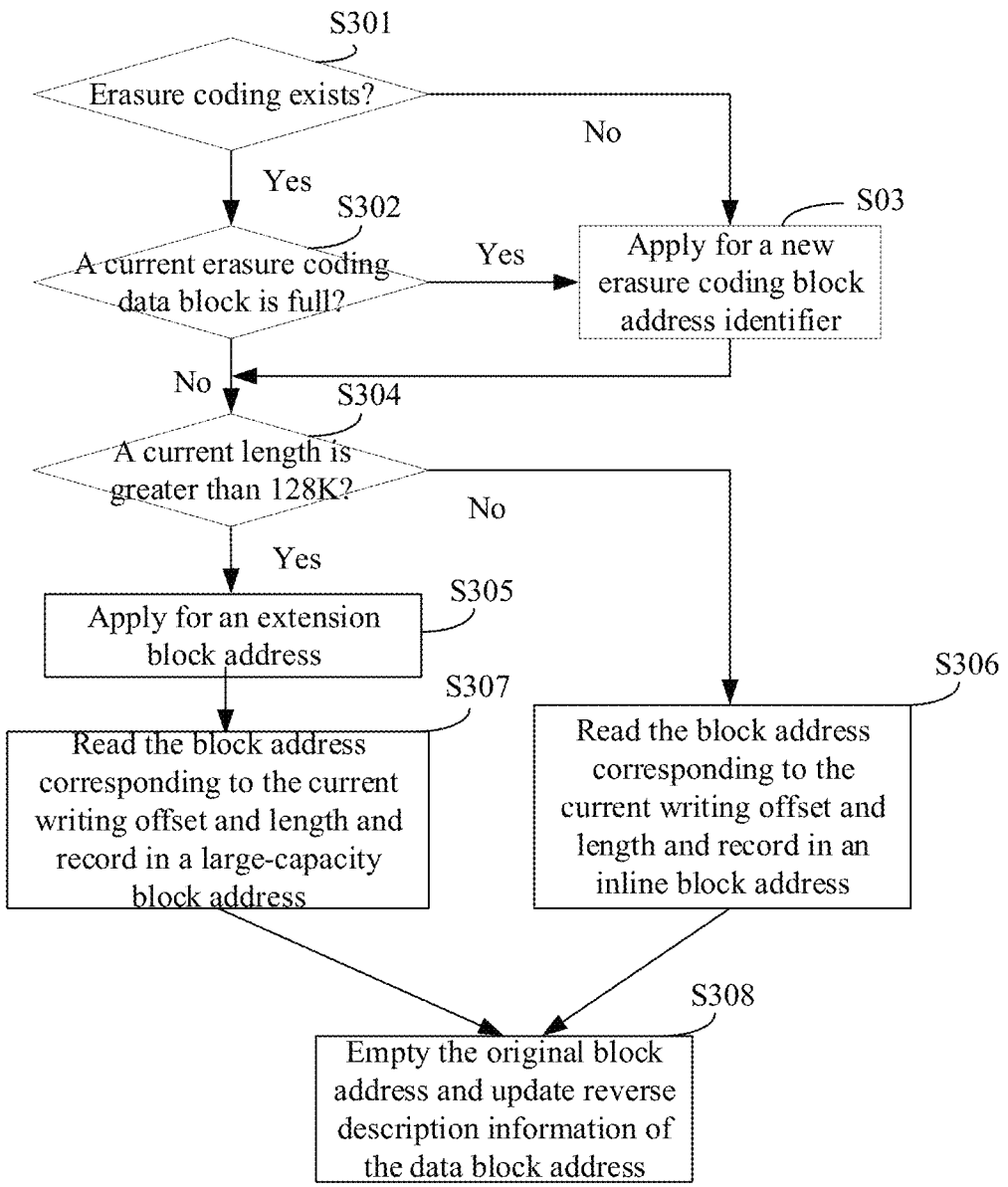
FIG. 4 is a schematic flow chart of data writing consistent with the embodiments of the disclosure.

FIG. 4 is a schematic flow chart of data writing consistent with the embodiments of the disclosure. As shown in FIG. 4, the method includes the following processes.

At S301, it is determined whether an erasure coding block address identifier exists, if yes, process S302 is executed, otherwise, process S303 is executed.

Process S301 is used to determine whether the erasure coding is full.

At S302, it is checked whether a current erasure coding data block is full, if yes, process S303 is executed, otherwise, process S304 is executed.

At S303, a new erasure coding block address identifier is applied for.

At S304, it is determined whether a current length of the modification of writing is greater than 128K, if yes, process S305 is executed, otherwise, process S306 is executed.

At S305, an extension block address is applied for.

At S306, the block address corresponding to the current writing offset and length is read and recorded in an inline block address.

At S307, the block address corresponding to the current writing offset and length is read and recorded in a large-capacity block address.

At S308, the original block address is emptied, and reverse description information of the data block address is updated.

Figure 5:
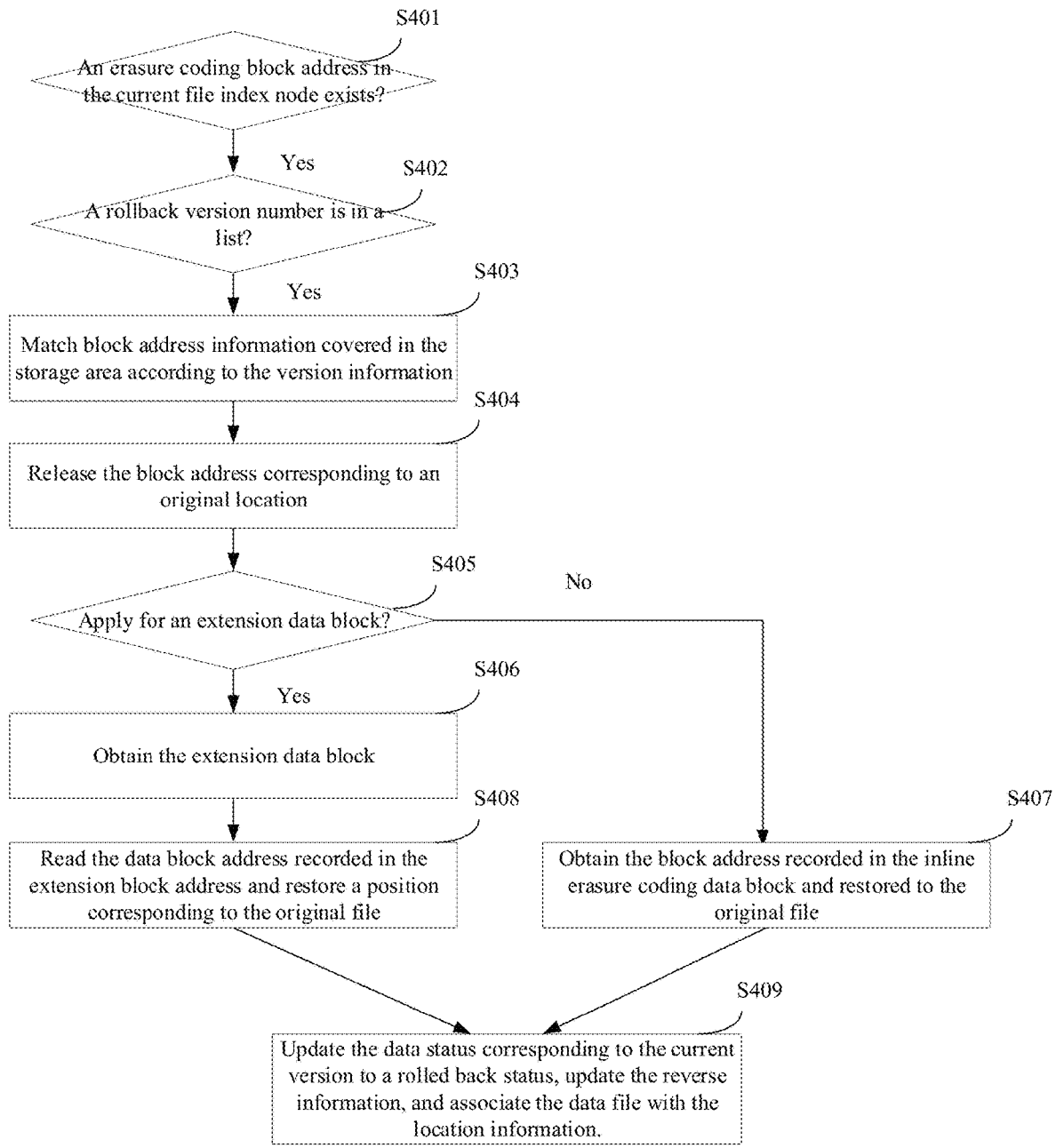
FIG. 5 is a schematic flow chart of data rollback consistent with the embodiments of the disclosure.

FIG. 5 is a schematic flow chart of data rollback consistent with the embodiments of the disclosure. As shown in FIG. 5, the data rollback includes the following processes.

At S401, it is determined whether the erasure coding block address in the current file index node exists, if yes, process S402 is executed, otherwise the data rollback ends.

At S402, it is determined whether a rollback version number is in a list, if yes, process S403 is executed, otherwise the data rollback ends.

At S403, block address information covered in the storage area is matched according to the version information.

At S404, the block address corresponding to an original location is released.

At S405, it is determined whether an extension data block is applied for, if yes, process S406 is executed, otherwise, process S407 is executed.

At S406, the extension data block is obtained, and process S408 is executed.

At S407, the block address recorded in the inline erasure coding data block is obtained and restored to the original file.

At S408, the data block address recorded in the extension block address is read, and a position corresponding to the original file is restored.

At S409, the data status corresponding to the current version is updated to a rolled back status, the reverse information is updated, and the data file is associated with the location information.

A data processing method consistent with the embodiments of the present disclosure is provided. When the data to be written is written, it is determined whether the first data exists in the data to be written, and if yes, the first data identifier of the first data and the corresponding first data storage area are determined. The second data identifier is generated, and the data to be written is written into the corresponding second data storage area. In this way, in response to receiving the data rollback instruction, the corresponding target storage area can be determined based on the target data identifier, and the rollback data can be obtained. It is realized that the relevant data can be written based on the data identifier, and the corresponding data can be rolled back based on the data identifier without the inefficient backup method through reading and writing to support the rollback, which improves the efficiency of data processing.

Figure 6:
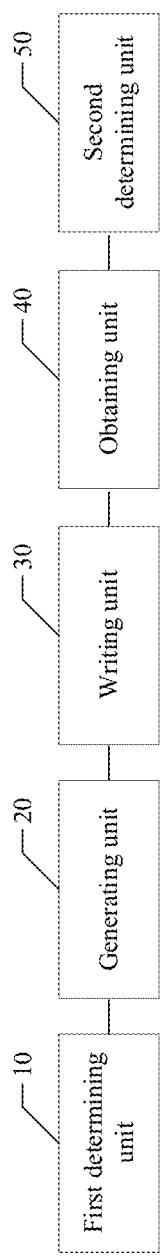
FIG. 6 is a schematic structural diagram of a data processing device consistent with the embodiments of the disclosure.

FIG. 6 is a schematic structural diagram of a data processing device consistent with the embodiments of the disclosure. As shown in FIG. 6, the data processing device includes a first determining unit 10, a generating unit 20, a writing unit 30, an obtaining unit 40, and a second determining unit 50.

The first determining unit 10 is configured to determine a first data identifier of first data if there is the first data corresponding to the received data to be written to obtain a first data storage area corresponding to the first data based on the first data identifier.

The generating unit 20 is configured to generate a second data identifier of the data to be written, where the second data identifier is different from the first data identifier. The second data identifier corresponds to a second data storage area different from the first storage area.

The writing unit 30 is configured to write the data to be written into the second storage area.

The obtaining unit 40 is configured to obtain a target data identifier corresponding to a data rollback instruction in response to receiving the data rollback instruction.

The second determining unit 50 is configured to determine a target storage area based on the target data identifier to obtain rollback data through the target storage area.

The device further includes an index generating unit configured to generate an index of the storage data of the storage area. The index representing a mapping relationship between the location information of the storage data of the storage area and the data identifier.

The device further includes an index storage unit configured to store the index in an index storage area.

The second determining unit is specifically configured to call the index of the index storage area and obtain the target storage area corresponding to the target data identifier based on the index, and obtain the rollback data of the target storage area.

On the basis of the above embodiments, the writing unit is further configured to write the data to be written into a free storage area if there is no first data corresponding to the data to be written.

On the basis of the above embodiments, the writing unit is specifically configured to obtain a target address of data in the second storage area based on the index, determine a writable data length of the second storage area according to the target address, write the data to be written into the second storage area if the writable data length is greater than or equal to the data length of the data to be written, and if the writable data length is less than the data length of the data to be written, determine a data extension area and write the data to be written into the data extension area.

On the basis of the above embodiments, the device further includes an index updating unit configured to update the index based on the writing address of the data extension area corresponding to the data to be written and the second data identifier of the data to be written.

On the basis of the above embodiments, the second determining unit is further configured to determine whether the data extension area is included based on location information of the stored data corresponding to the target data identifier; if not, obtain the target data from the target storage area; if yes, obtain the target data from the data extension area.

On the basis of the above embodiments, the data rollback instruction includes an erasure coding rollback request. The device further includes an information adding unit configured to add rollback status information to the data identifier corresponding to the rollback data in response to completing the data rollback of the rollback data.

On the basis of the above embodiments, the device further includes a deleting unit configured to check whether any data meets a deletion condition if the target storage area stores multiple pieces of data with different data identifiers, and if so, delete the data that meets the deletion condition from the target storage area.

The index updating unit is further configured to update the index of the index storage area according to the data after deletion.

On the basis of the above embodiments, an electronic device consistent with the embodiments of the present disclosure is provided. The electronic device includes a memory storing a computer program, and a processor. The processor is configured to execute the computer program to implement the data processing method described above and the processes related to the data processing method.

Based on the above embodiments, a non-transitory computer-readable storage medium consistent with the embodiments of the present disclosure is provided. The computer-readable storage medium stores one or more programs, and the one or more programs can be executed by one or more processors to realize the processes of the above data processing method.

The processor may include at least one of a specific application integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. The electronic device that implements the above processor function may also include another device, which is not limited here.

The computer storage medium/memory may include a read only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disk, or a compact disc read-only memory (CD-ROM). The computer storage medium/memory may also include a variety of terminals including one or any combination of the above memories, for example, mobile phones, computers, tablets, and personal digital assistants, etc.

The device and method of the present disclosure may be implemented in another manner. The device embodiments described above are merely illustrative. For example, the division of the units is only a logical function division. There may be other divisions in actual implementation, for example, multiple units or components can be combined, or can be integrated into another system, or some features can be ignored or not implemented. In addition, the coupling, or direct coupling, or communication connection between the components shown or discussed may be indirect coupling or communication connection through some interfaces, devices, or units, and may be in forms of electrical, mechanical, or another form.

The units described above as separate components may or may not be physically separate. The components displayed as units may or may not be physical units, that is, they may be located in one place or distributed in multiple network units. Some or all of the units may be selected according to actual needs to achieve the objectives of the solutions of the embodiments.

In addition, the functional units consistent with the embodiments of the present disclosure can be all integrated into one processing module, or each unit can be individually used as a unit, or two or more units can be integrated into one unit. The integrated unit can be implemented in a form of hardware, or in a form of hardware plus software functional units. A person of ordinary skill in the art can understand that all or some of the processes in the above method embodiments can be implemented by a program instructing relevant hardware. The program can be stored in a computer readable storage medium. When the program is executed, some or all of the processes of the method embodiments are executed. The storage medium includes any medium that can store program codes, for example, a mobile storage device, a read-only memory (ROM), a random-access memory (RAM), a magnetic disk, or an optical disk.

The methods consistent with the embodiments of the present disclosure can be combined arbitrarily when there is no conflict.

The features consistent with the embodiments of the present disclosure can be combined arbitrarily when there is no conflict.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A data processing method comprising:
   in response to determining that data corresponding to received data to be written exists, determining a first data identifier of the data corresponding to the data to be written, the first data identifier being configured to obtain a first storage area corresponding to the data;
   generating a second data identifier of the data to be written, the second data identifier being different from the first data identifier, and the second data identifier corresponding to a second storage area different from the first storage area;
   writing the data to be written into the second storage area, including:
      obtaining a target address in the second storage area;
      determining a data writable length of the second storage area according to the target address;
      in response to the data writable length being greater than or equal to a data length of the data to be written, writing the data to be written into the second storage area; and
      in response to the data writable length being less than the data length of the data to be written, determining a data extension area and writing the data to be written into the data extension area;
   in response to receiving a data rollback instruction, obtaining a target data identifier corresponding to the data rollback instruction; and
   determining a target storage area based on the target data identifier to obtain rollback data from the target storage area.

2. The method of claim 1, further comprising:
   in response to determining that no data corresponding to the data to be written exists, writing the data to be written into a free storage area.

3. The method of claim 1, further comprising:
   generating an index of stored data in a storage including the first storage area and the second storage area, the index representing a mapping relationship between location information of the stored data and a data identifier; and
   storing the index in an index storage area of the storage;
   wherein determining the target storage area based on the target data identifier includes:
      calling the index in the index storage area, and obtaining the target storage area corresponding to the target data identifier based on the index; and
      obtaining the rollback data from the target storage area.

4. The method of claim 3, wherein obtaining the target address in the second storage area includes:
   obtaining the target address in the second storage area based on the index.

5. The method of claim 1, further comprising:
   updating the index based on a writing address of the data extension area corresponding to the data to be written and the second data identifier of the data to be written.

6. The method of claim 1, wherein obtaining the rollback data from the target storage area includes:
   determining whether the data extension area is included based on the location information of stored data corresponding to the target data identifier;
   in response to determining that the data extension area is not included, obtaining the target data from the target storage area; and
   in response to determining that the data extension area is included, obtaining the target data from the data extension area.

7. The method of claim 3, further comprising:
   in response to the target storage area storing multiple pieces of data with different data identifiers, checking whether any of the multiple pieces of data meets a deletion condition; and
   in response to determining that one piece of data meets the deletion condition:
      deleting the one piece of data from the target storage area; and
      updating the index in the index storage area according to data after deletion.

8. The method of claim 1, wherein the data rollback instruction includes an erasure coding rollback request;
   the method further comprising:
   in response to completing a data rollback of the rollback data, adding rollback status information to the data identifier corresponding to the rollback data.

9. An electronic device comprising:
   a memory storing a computer program; and
   a processor configured to execute the computer program to:
   in response to determining that data corresponding to received data to be written exists, determine a first data identifier of the data corresponding to the data to be written, the first data identifier being configured to obtain a first storage area corresponding to the data;
   generate a second data identifier of the data to be written, the second data identifier being different from the first data identifier, and the second data identifier corresponding to a second storage area different from the first storage area;
   write the data to be written into the second storage area, including:
      obtaining a target address in the second storage area;
      determining a data writable length of the second storage area according to the target address;
      in response to the data writable length being greater than or equal to a data length of the data to be written, writing the data to be written into the second storage area; and
      in response to the data writable length being less than the data length of the data to be written, determining a data extension area and writing the data to be written into the data extension area;

in response to receiving a data rollback instruction, obtain a target data identifier corresponding to the data rollback instruction; and determine a target storage area based on the target data identifier to obtain rollback data from the target storage area.

10. The electronic device of claim 9, wherein the processor is further configured to execute the computer program to:

in response to determining that no data corresponding to the data to be written exists, write the data to be written into a free storage area.

11. The electronic device of claim 9, wherein:

the processor is further configured to execute the computer program to:

generate an index of stored data in a storage including the first storage area and the second storage area, the index representing a mapping relationship between location information of the stored data and a data identifier;

store the index in an index storage area of the storage;

call the index in the index storage area, and obtaining the target storage area corresponding to the target data identifier based on the index; and obtain the rollback data from the target storage area.

12. The electronic device of claim 11, wherein the processor is further configured to execute the computer program to:

obtain the target address of data in the second storage area based on the index.

13. The electronic device of claim 9, wherein the processor is further configured to execute the computer program to:

update the index based on a writing address of the data extension area corresponding to the data to be written and the second data identifier of the data to be written.

14. The electronic device of claim 9, wherein the processor is further configured to execute the computer program to:

determine whether the data extension area is included based on the location information of stored data corresponding to the target data identifier;

in response to determining that the data extension area is not included, obtain the target data from the target storage area; and in response to determining that the data extension area is included, obtain the target data from the data extension area.

15. The electronic device of claim 9, wherein the processor is further configured to execute the computer program to:

in response to the target storage area storing multiple pieces of data with different data identifiers, check whether any of the multiple pieces of data meets a deletion condition; and in response to determining that one piece of data meets the deletion condition:

delete the one piece of data from the target storage area; and update the index in the index storage area according to data after deletion.

16. The electronic device of claim 9, wherein:

the data rollback instruction includes an erasure coding rollback request;

the processor is further configured to execute the computer program to:

in response to completing a data rollback of the rollback data, add rollback status information to the data identifier corresponding to the rollback data.

17. A data processing method comprising:

in response to determining that data corresponding to received data to be written exists, determining a first data identifier of the data corresponding to the data to be written, the first data identifier being configured to obtain a first storage area corresponding to the data;

generating a second data identifier of the data to be written, the second data identifier being different from the first data identifier, and the second data identifier corresponding to a second storage area different from the first storage area;

generating an index of stored data in a storage including the first storage area and the second storage area, the index representing a mapping relationship between location information of the stored data and a data identifier;

storing the index in an index storage area of the storage;

writing the data to be written into the second storage area, including:

obtaining a target address in the second storage area based on the index;

determining a data writable length of the second storage area according to the target address;

in response to the data writable length being greater than or equal to a data length of the data to be written, writing the data to be written into the second storage area; and in response to the data writable length being less than the data length of the data to be written, determining a data extension area and writing the data to be written into the data extension area;

in response to receiving a data rollback instruction, obtaining a target data identifier corresponding to the data rollback instruction; and determining a target storage area based on the target data identifier to obtain rollback data from the target storage area, including:

calling the index in the index storage area, and obtaining the target storage area corresponding to the target data identifier based on the index; and obtaining the rollback data from the target storage area.

* * * * *